United States Patent
Viegas et al.

(10) Patent No.: US 9,868,336 B2
(45) Date of Patent: Jan. 16, 2018

(54) METHOD AND SYSTEM FOR CONTROLLING CONDENSER/RADIATOR AIRFLOW

(71) Applicant: THERMO KING CORPORATION, Minneapolis, MN (US)

(72) Inventors: Herman H. Viegas, Bloomington, MN (US); Rodney H. Volk, Eden Prairie, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 613 days.

(21) Appl. No.: 14/497,948

(22) Filed: Sep. 26, 2014

(65) Prior Publication Data

US 2016/0089956 A1    Mar. 31, 2016

(51) Int. Cl.
  *B60H 1/00* (2006.01)
  *B60H 1/32* (2006.01)
  *B60P 3/20* (2006.01)

(52) U.S. Cl.
  CPC ......... *B60H 1/3211* (2013.01); *B60H 1/3227* (2013.01); *B60H 1/3232* (2013.01); *B60H 2001/3258* (2013.01); *B60H 2001/3277* (2013.01); *B60P 3/20* (2013.01)

(58) Field of Classification Search
  CPC ............. B60H 1/00014; B60H 1/00764; F24F 11/0012; F24F 11/0079
  See application file for complete search history.

(56) References Cited

U.S. PATENT DOCUMENTS

| | | | |
|---|---|---|---|
| 2,192,221 A * | 3/1940 | Brizzolara | B60H 1/00007 165/42 |
| 2,684,620 A * | 7/1954 | Schoelles | B60H 1/00042 237/12.3 B |
| 4,663,725 A | 5/1987 | Truckenbrod et al. | |
| 5,557,938 A | 9/1996 | Hanson et al. | |
| 5,954,577 A * | 9/1999 | Meckler | B60H 3/0625 454/158 |
| 6,560,980 B2 | 5/2003 | Gustafson et al. | |
| 7,003,968 B2 | 2/2006 | Ben Yahia | |
| 7,080,521 B2 | 7/2006 | Ludwig et al. | |
| 7,174,733 B2 | 2/2007 | Oomura et al. | |
| 7,266,961 B2 | 9/2007 | Ludwig et al. | |

(Continued)

*Primary Examiner* — Dominick L Plakkoottam
*Assistant Examiner* — Antonio R Febles
(74) *Attorney, Agent, or Firm* — Hamre, Schumann, Mueller & Larson, P.C.

(57) ABSTRACT

Methods and systems for controlling condenser/radiator airflow in a TRS are provided. In particular, methods and systems are provided to control a fan speed of condenser fan(s) of a TRS based on a condenser/radiator performance parameter, a traveling speed of a refrigerated transport unit, and/or a compressor discharge pressure a compressor of the TRS. The fan speed of the condenser fan(s) can be increased when necessary to limit a negative impact on TRS performance caused by a static pressure at an outlet of the condenser fan(s) or under high ambient temperature conditions. The fan speed of the condenser fan(s) can be reduced to reduce noise levels generated by the TRS when the static pressure at the outlet of the condenser fan(s) does not negatively impact the performance of the TRS or when the refrigerated transport unit is not located in an area with a high ambient temperature.

19 Claims, 6 Drawing Sheets

(56) References Cited

U.S. PATENT DOCUMENTS

| | | | |
|---|---|---|---|
| 7,275,378 B2 * | 10/2007 | Errington | B60H 1/00764 |
| | | | 62/133 |
| 7,878,013 B2 | 2/2011 | Matsuno et al. | |
| 7,921,659 B2 | 4/2011 | Quesada | |
| 7,963,117 B2 | 6/2011 | Allen et al. | |
| 2002/0108388 A1 | 8/2002 | Wilson et al. | |
| 2005/0172652 A1 | 8/2005 | Ben Yahia | |
| 2005/0210897 A1 | 9/2005 | Oomura et al. | |
| 2005/0279113 A1 | 12/2005 | Hoshi et al. | |
| 2006/0248907 A1 | 11/2006 | Allen et al. | |
| 2007/0125106 A1 * | 6/2007 | Ishikawa | B60H 1/3217 |
| | | | 62/183 |
| 2010/0064703 A1 | 3/2010 | Senf, Jr. et al. | |
| 2011/0162395 A1 | 7/2011 | Chakiachvili et al. | |
| 2013/0036756 A1 * | 2/2013 | Post | F25B 49/027 |
| | | | 62/186 |
| 2015/0343941 A1 * | 12/2015 | Lawrence | B60P 3/20 |
| | | | 454/91 |

\* cited by examiner

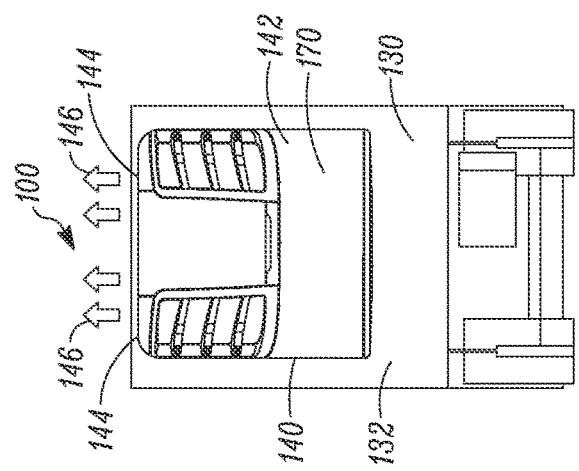
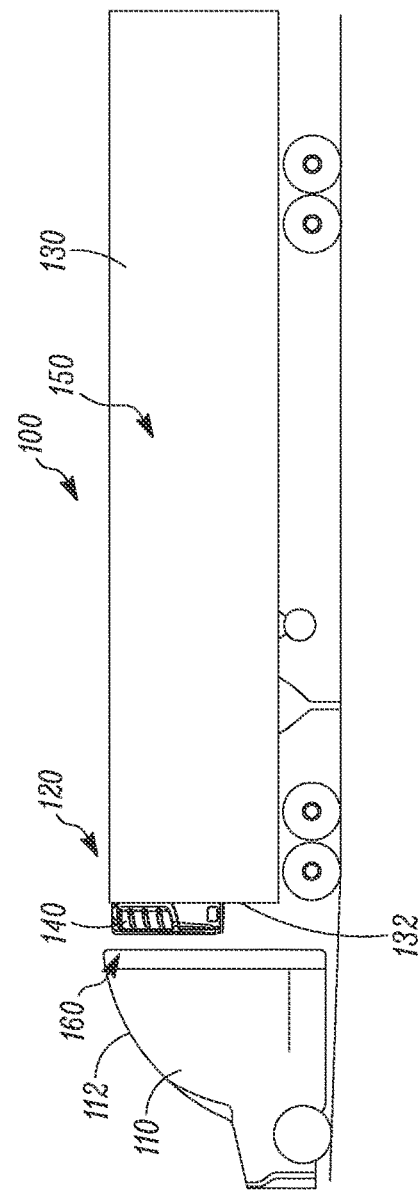
FIG. 1B
FIG. 1A

METHOD AND SYSTEM FOR CONTROLLING CONDENSER/RADIATOR AIRFLOW

FIELD

The embodiments disclosed herein relate generally to a transport refrigeration system (TRS). More particularly, the embodiments relate to methods and systems for controlling condenser/radiator airflow in a TRS.

BACKGROUND

A transport refrigeration system (TRS) is generally used to control an environmental condition (e.g., temperature, humidity, air quality, and the like) within a refrigerated transport unit (e.g., a container on a flat car, an intermodal container, etc.), a truck, a box car, or other similar transport unit (generally referred to as a "refrigerated transport unit"). Refrigerated transport units are commonly used to transport perishable items such as produce, frozen foods, and meat products. Typically, a transport refrigeration unit (TRU) is attached to the refrigerated transport unit to control the environmental condition of the cargo space. The TRU can include, without limitation, a compressor, a condenser, an expansion valve, an evaporator, and fans or blowers to control the heat exchange between the air inside the cargo space and the ambient air outside of the refrigerated transport unit.

SUMMARY

The embodiments described herein are directed to a TRS. In particular, the embodiments described herein are directed to methods and systems for controlling condenser/radiator airflow in a TRS.

In particular, the embodiments described herein provide systems and methods for controlling condenser/radiator airflow in a TRS by controlling a fan speed of one or more condenser fans of a TRS based on one or more of a condenser or radiator performance parameter, a traveling speed of a refrigerated transport unit in which the TRS is provided, and/or a compressor discharge pressure of a compressor of the TRS.

When the condenser fan(s) is operating at the low speed, the TRS can gain a fan power reduction that can result in fuel savings for operating the TRS. For example, when the static air pressure at the outlet of the condenser fans does not negatively impact performance of the TRS, the condenser/radiator airflow in the TRS can be controlled such that the condenser fans are operated at a low speed to reduce the amount of power and noise generated by the TRS. Then, when the static air pressure at the outlet of the condenser fans negatively impact performance of the TRS, the TRS can be controlled to increase a fan speed of the condenser fan(s) to overcome the static air pressure at the outlet of the condenser fans and provide fuel savings for operating the TRS.

In some embodiments, the condenser/radiator airflow in a TRS can be controlled when a condenser coil or radiator coil becomes partially blocked, regardless of the travelling speed of the refrigerated transport unit. In particular, a fan speed of one or more condenser fans of the TRS can be increased to overcome a high static pressure that results from the condenser and/or radiator coil blockage.

In some embodiments, when the refrigerated transport unit is travelling at high speeds but a TRS Controller of the TRS determines that the static pressure at the outlet of the condenser fans is not increasing to a point where it may negatively impact the performance of the TRS, the TRS can be controlled to operate the condenser fans at a low speed.

Also, in some embodiments, the condenser/radiator airflow in the TRS can be controlled when an optimal compressor discharge pressure is not maintained. In particular, a fan speed of one or more condenser fans of the TRS can be increased to reduce a compressor discharge pressure that is above the optimal compressor discharge pressure of the TRU.

In some embodiments, the one or more condenser fans are two speed condenser fans. Also, in some embodiments, the two speed condenser fan(s) can be electronically controlled condenser fan(s) that include a boost mode to further increase the speed of the condenser fan(s). In other embodiments, one or more of the condenser fans are variable speed condenser fans. In yet some other embodiments, the speed of one or more of the condenser fans can vary based on an engine frequency of an engine of the TRS.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

FIG. 1A illustrates a side view of a refrigerated transport unit attached to a tractor, according to one embodiment.

FIG. 1B illustrates a back view of the refrigerated transport unit shown in FIG. 1A, according to one embodiment.

DETAILED DESCRIPTION

Figure 2A:
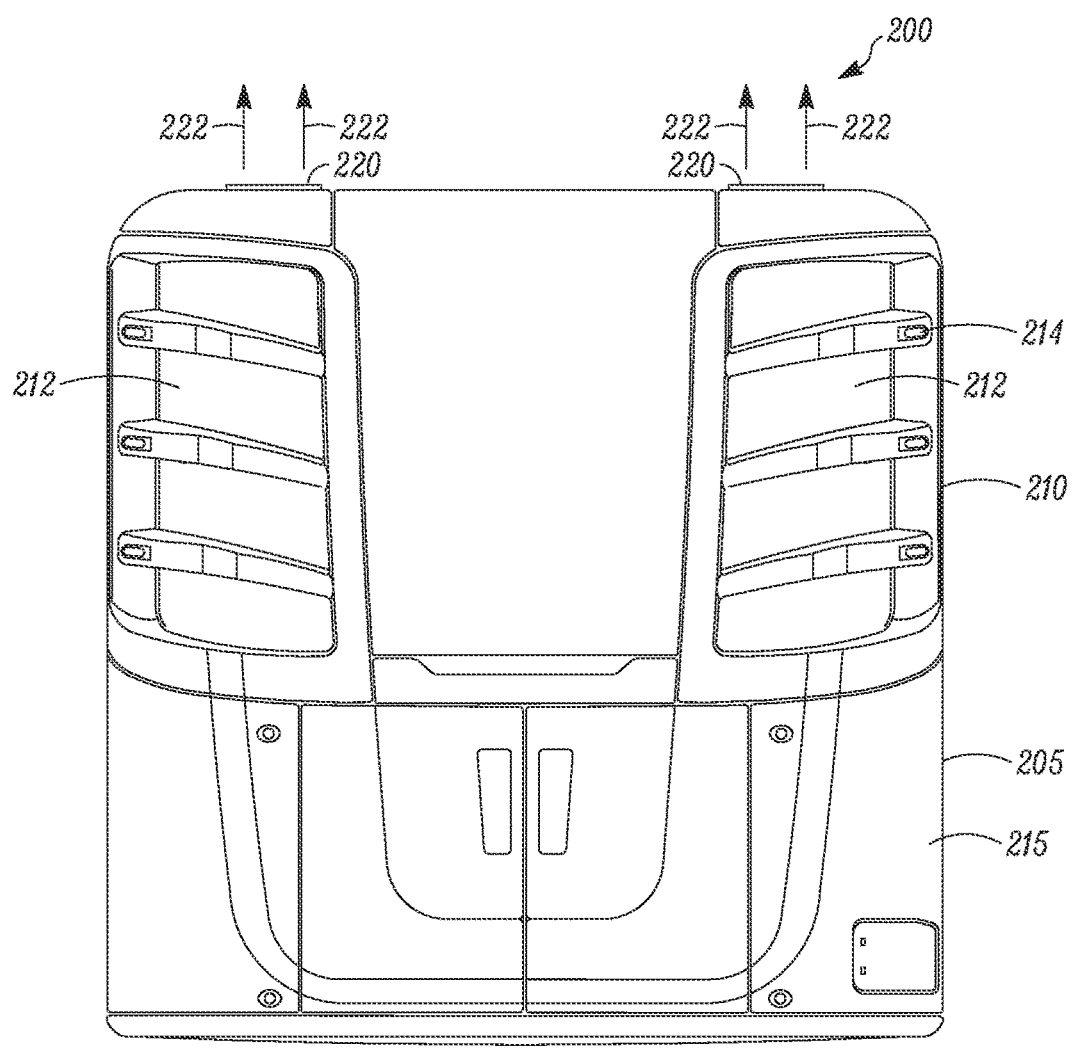
FIG. 2A illustrates a front view of a TRU, according to one embodiment.

The embodiments described herein are directed to a transport refrigeration system (TRS). More particularly, the embodiments relate to methods and systems for controlling condenser/radiator airflow in a TRS.

References are made to the accompanying drawings that form a part hereof, and in which is shown by way of illustration of the embodiments in which the methods and systems described herein may be practiced. The term "refrigerated transport unit" generally refers to, for example, a conditioned trailer, container, railcars or other type of transport unit, etc. The term "transport refrigeration system" or "TRS" refers to a refrigeration system for controlling the refrigeration of a conditioned interior space of the refrigerated transport unit. The term "TRS controller" refers to an electronic device that is configured to manage, command, direct and regulate the behavior of one or more TRS refrigeration components of a refrigeration circuit (e.g., an evaporator, a condenser, a compressor, an expansion valve (EXV) etc.), a generator, etc.

It will be appreciated that the embodiments described herein may be used in any suitable temperature controlled apparatus such as a ship board container, a straight truck, an over the road truck cabin, etc. The TRS may be a vapor-compressor type refrigeration system, or any other suitable refrigeration system that can use refrigerant, cold plate technology, etc.

FIGS. 1A and 1B illustrate different views of a refrigerated transport unit 100 that is towed by a tractor 110, with which the embodiments as described herein can be practiced. As shown in FIG. 1A, the refrigerated transport unit 100 includes a TRS 120 and a transport unit 130. The TRS 120 is configured to control a temperature of an internal space 150 of the transport unit 130. In particular, the TRS 120 is configured to transfer heat between an internal space 150 and the outside environment. In some embodiments, the TRS 120 is a multi-zone system in which different zones or areas of the internal space 150 are controlled to meet different refrigeration requirements based on the cargo stored in the particular zone. The TRS 120 includes a transport refrigeration unit (TRU) 140.

The TRU 140 can include an engine (not shown) that provides mechanical power directly to components (e.g., a compressor) of the TRS 120 or electrical power via an alternator (not shown).

As shown in FIG. 1B, the TRU 140 is provided at the front wall 132 of the transport unit 130 and includes a housing 142 and two condenser fans 144 at a top end of the TRU 140. Each of the two condenser fans 144 are configured to discharge air out of the TRU 140 in a vertically upward direction as shown by arrows 146. The condenser fans 144 shown in FIG. 1B are axial fans. In some embodiments, the condenser fans 144 can be, for example, vane axial fans.

In some embodiments, the condenser fans 144 can be electrically driven, for example, via a belt driven generator that is configured to generate electrical power via an engine. In these embodiments, the speed (e.g., rpm) of the condenser fans 144 can be frequency controlled based on a speed of an engine in the TRU 140. In some embodiments, a road side condenser fan of the condenser fans 144 can operate at ~2650 rpm when the engine is operating at ~2050 rpm. When the engine is operating at ~1250 rpm, the road side condenser fan of the condenser fans 144 can operate at ~1620 rpm under a normal operation mode or at ~3250 rpm under a boost operation mode.

In other embodiments, the condenser fans 144 can be two-speed condenser fans that are configured to be electronically controlled to operate at a high speed and a low speed depending on the speed at which that the refrigerated transport unit 100 is travelling. In these embodiments, the high speed of the condenser fans 144 can be ~2650 rpm, when e.g., the refrigerated transport unit 100 is travelling at or above ~60 mph. The low speed of the condenser fans can be ~1620 rpm, when e.g., the refrigerated transport unit 100 is travelling below ~60 mph. Also, a road side condenser fan and/or a curb side condenser fan of the condenser fans 144 can include a boost that allows the condenser fan 144 to run at 3250 rpm when the refrigerated transport unit 100 is travelling at or above ~60 mph.

In yet some other embodiments, the condenser fans 144 are variable speed condenser fans whereby the speed of the condenser fans 144 can be controlled by a TRS Controller (not shown) of the TRU 140.

Further, in some embodiments, the condenser fans 144 can be variable pitch fans whereby a pitch of one or more blades of the variable pitch fans can be modified as necessary to overcome an increased static pressure at an outlet of the condenser fans 144.

The transport unit 130 can be attached to the tractor 110 via a fifth wheel (not shown) of the tractor 110. The tractor 110 generally has a wind deflector 112 disposed on top of the tractor 110. After the transport unit 130 is attached to the tractor 110, an air gap 160 is formed between a back of the tractor 110 including the wind deflector 112 and the front wall 132 of the transport unit 130. The TRU 140 is generally positioned in the air gap 160.

While FIGS. 1A and 1B show the transport unit 130 as a trailer type transport unit towed by the tractor 110, it is to be understood that the embodiments as described herein can be used with other types of transport units, such as containers (e.g., containers on flat cars, intermodal containers, etc.), trucks, box cars, etc.

Figure 2B:
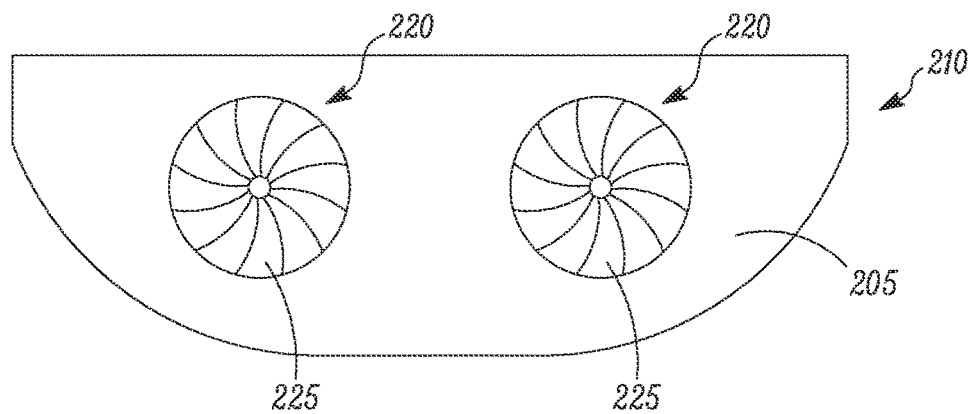
FIG. 2B illustrates a top view of the TRU shown in FIG. 2A, according to one embodiment.

FIGS. 2A and 2B illustrate front and top views of a TRU 200 for a TRS, with which the embodiments as described herein can be practiced. The TRU 200 is configured to be in communication with an internal space (e.g. the internal space 150 shown in FIG. 1A) and is configured to control the temperature in the internal space. The components within the TRU 200 including the condenser 212 are described below with respect to FIG. 3.

As shown in FIG. 2A, the TRU 200 has a housing 205, which includes an upper compartment 210 and a lower compartment 215. The upper compartment 210 is generally positioned above the lower compartment 215. A condenser 212 is positioned inside the upper compartment 210. An evaporator (not shown) of the TRU 200 can also be housed in the upper compartment 210. In some embodiments, a radiator and an intercooler can also be housed in the upper compartment 210. The upper compartment 210 has a guard 214 to enclose the condenser 212. The lower compartment 215 can house, for example, a compressor (not shown), an engine (not shown), an auxiliary generator (not shown), a battery (not shown), a TRS controller (not shown) and a human-machine interface (HMI) (not shown).

As shown in FIG. 2B, the top of the housing 205 of the TRU 200 includes two condenser fans 220 with condenser fan outlets 225. The condenser fans 220 are configured to discharge air from within the upper compartment 210 out of the TRU 200 in a vertically upward direction as shown by arrows 222 (see FIG. 2A). While the TRU 200 includes two condenser fans 220, in other embodiments, the TRU 200 can be designed to include only a single condenser fan or three or more condenser fans, based on the desired configuration.

Figure 3:
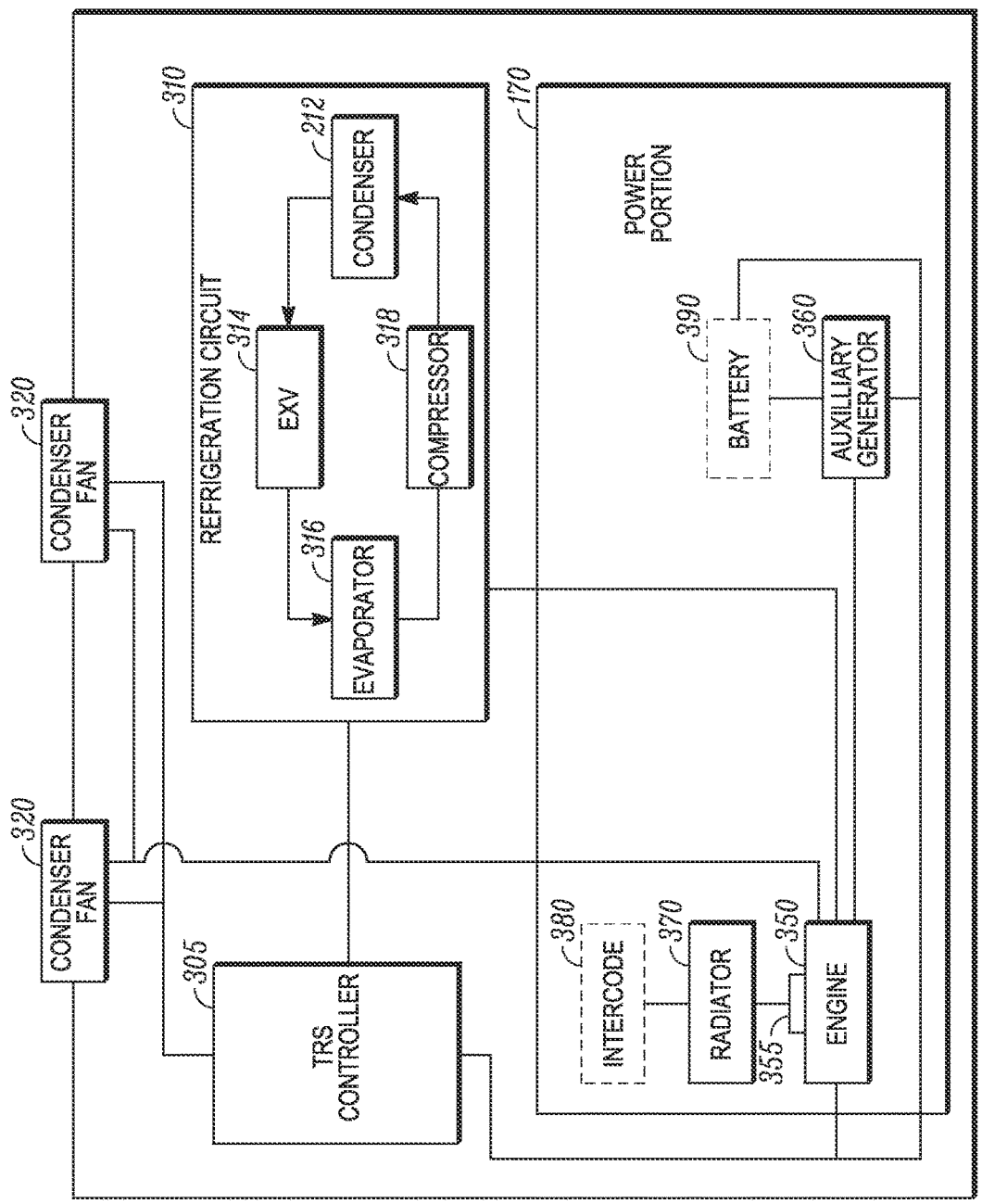
FIG. 3 illustrates a block diagram of a TRU of a TRS, according to one embodiment.

FIG. 3 illustrates a block diagram of components within the TRU 200, according to one embodiment. The TRU 200 includes a TRS Controller 305, a refrigeration circuit 310, two condenser fans 320, and a power portion 170.

The TRS Controller 305 is connected to and configured to control the refrigerant circuit 310, two condenser fans 320 and the power portion 170. The TRS Controller 305 controls the refrigeration circuit 310 to obtain various operating conditions (e.g., temperature, humidity, etc.) of an internal space (e.g., the internal space 150 shown in FIG. 1A) of a transport unit and can be powered by the powered portion 170 and/or another power source (not shown).

The refrigeration circuit 310 regulates various operating conditions (e.g., temperature, humidity, etc.) of the internal space based on instructions received from the TRS Controller 305. The refrigeration circuit 310 includes the condenser 212, an expansion valve (EXV) 314, an evaporator 316 and a compressor 318 that together cool the internal space and any perishable cargo contained therein. The condenser 212 is in airflow communication with the condenser fans 320.

The power portion 170 provides power to the TRU 200 and other components of a TRS. The power portion 170 includes an engine or prime mover 350, an auxiliary generator 360, a radiator 370, an optional intercooler 380 and an optional battery 390.

The engine 350 is configured to provide mechanical power to the auxiliary generator 360 and to components to the TRS including, for example, components of the refrigeration circuit 310 (e.g., the compressor 318) and the condenser fans 320. In some embodiments, the engine 350 can be a diesel combustion engine. Also, in some embodiments, the engine 350 can be an electronically controlled engine that includes an electronic control unit (not shown) that can communicate with the TRS Controller 305.

The auxiliary generator 360 and the optional battery 390 (when present) are configured to provide electrical power to components of the TRS including, for example, the TRS Controller 305. In some embodiments, the auxiliary generator 360 can be an alternator. Also, in some embodiments, the auxiliary generator 360 can be configured to recharge the optional battery 390. In some embodiments, the optional battery 390 can be a ~12 volt battery.

The radiator 370 is configured to transfer heat away from the engine 350. In some embodiments, the radiator 370 is in airflow communication with the condenser fans 320. The optional intercooler 380 is configured to transfer heat away from the compressor 318.

The power portion 170 also includes a condenser/radiator performance parameter sensor 355 configured to determine/measure data that correlates to a performance of the radiator 370 and/or the condenser 212. In some embodiments, the condenser/radiator performance parameter sensor 355 is an engine coolant outlet temperature sensor configured to measure a temperature of engine coolant (e.g., water) at an engine coolant outlet (not shown) of the engine 350. In other embodiments, the condenser/radiator performance parameter sensor 355 is a radiator air discharge temperature sensor configured to measure an air discharge temperature from the radiator 370. While the condenser/radiator performance parameter sensor 355 in FIG. 3 is located at a fluid outlet of the engine 350, in other embodiments, the condenser/radiator performance parameter sensor 355 can be provided on or adjacent to the radiator 370.

When the TRU 200 is travelling at high speeds (e.g., ~60 mph or greater), high velocity ambient air can sweep over the top of the TRU 200 and the condenser fan outlets 225. This can increase the static air pressure at the condenser fan outlets 225 which can negatively affect the performance of the TRU 200.

That is, an increase in the static air pressure at the outlet of the condenser fans can create a loss of airflow to components within the TRU (e.g., a radiator of the TRU) and generate high compressor discharge pressures of a compressor of the TRU 200. In some embodiments, an ~80% loss in condenser/radiator airflow can result in an ~80% loss in airflow at a radiator of the TRU. This loss in radiator airflow can result in an engine of the TRS to overheat, causing the TRS to shut down—thereby negatively affecting the performance of the TRU 200.

For example, it has been found that when the engine 350 is running at ~2050 rpm, the condenser fans 144 are configured to operate at ~2650 rpm. At these conditions, when the TRU 200 is not moving (e.g., the refrigerated transport unit having the TRU 200 is parked), the airflow from the condenser fans 144 has been found to be about 5700 cfm. When the TRU 200 is travelling at about 60 mph, the airflow from the condenser fans 144 has been found to be about 3800 cfm. This reduction in airflow has been found to be acceptable in maintaining performance of the TRU.

In another example, it has been found that when the engine 305 is running at ~1250 rpm, the condenser fans 144 are configured to operate at ~1620 rpm. At these conditions, when the TRU 200 is not moving (e.g., the refrigerated transport unit having the TRU 200 is parked), the airflow from the condenser fans 144 has been found to be about 3500 cfm. When the TRU 200 is travelling at about 60 mph, the airflow from the condenser fans 144 has been found to be about 700 cfm. This reduction in airflow has been found to negatively impact the performance of the TRU.

In yet another example, when one or more of the condenser fans 144 have a boost mode, the one or more condenser fans can run at about 3250 rpm. At these conditions, when the TRU 200 is travelling at about 60 mph, the airflow from a road side condenser fan of the one or more condenser fans 144 under the boost mode has been found to be about 2600 cfm and a curb side condenser fan of the one or more condenser fans 144 under the boost mode has been found to be about 400-600 cfm. This airflow has been found to not negatively impact the performance of the TRU.

Figure 4:
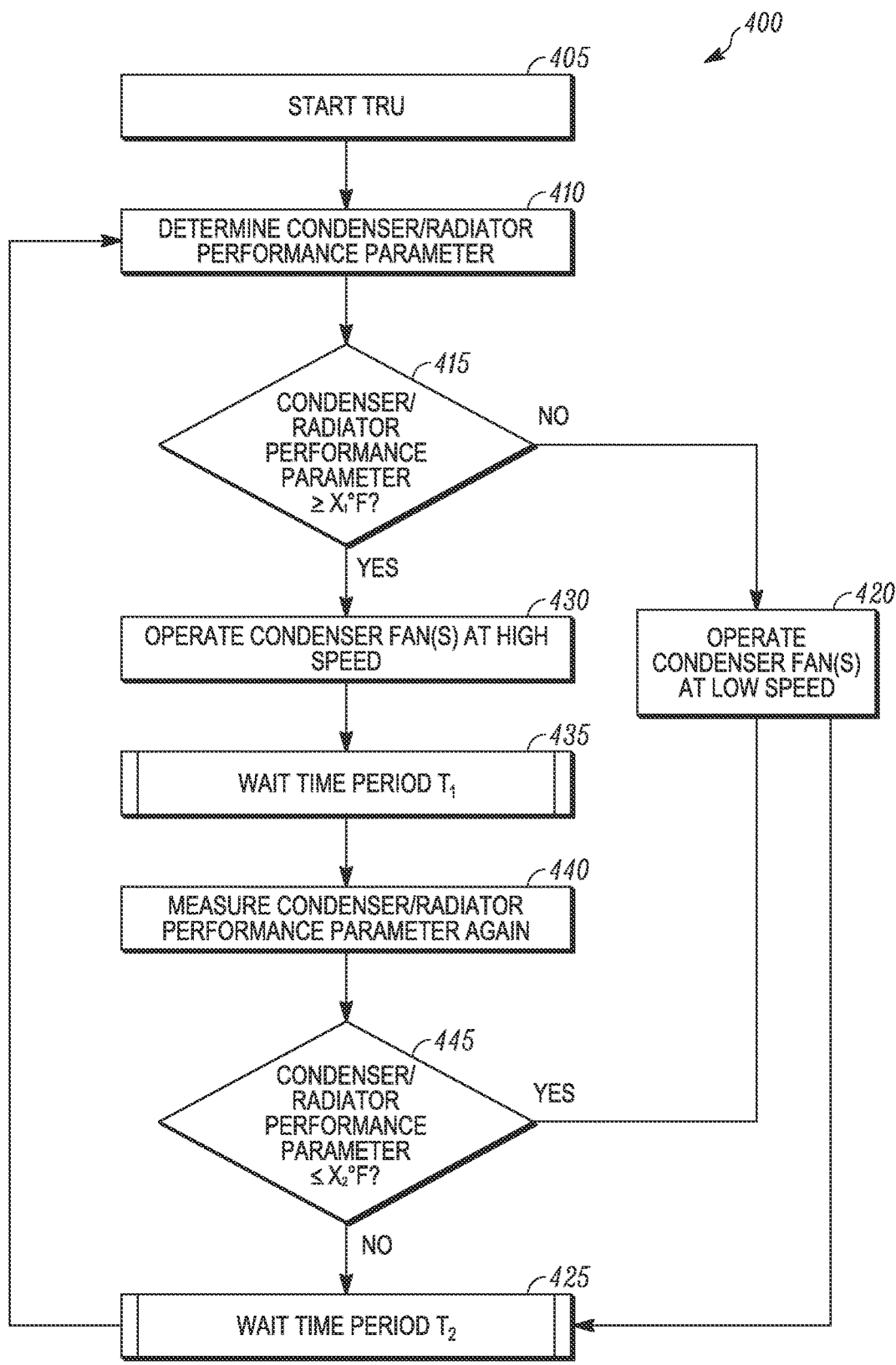
FIG. 4 illustrates a flowchart of a process for controlling condenser/radiator airflow of the TRS, according to one embodiment.

FIG. 4 illustrates one embodiment of a process 400 for controlling condenser/radiator airflow of a TRS (e.g., the TRS 120 shown in FIG. 1A) based on a condenser/radiator performance parameter. At 405, a TRU (e.g., the TRU 140 shown in FIG. 1A) is started. The process 400 then proceeds to 410.

At 410, a TRS Controller of the TRU (e.g., the TRS Controller 305 shown in FIG. 3) determines/measures a condenser/radiator performance parameter of a radiator of the TRS (e.g., the radiator 370 shown in FIG. 3) or a condenser of the TRS (e.g., the condenser 212 shown in FIG. 3). In some embodiments, a condenser/radiator performance parameter sensor (e.g., the condenser/radiator performance parameter sensor 355 shown in FIG. 3) measures the condenser/radiator performance parameter and sends the obtained data to the TRS Controller.

For example, in one embodiment, the condenser/radiator performance parameter sensor is an engine coolant outlet temperature sensor that is configured to measure an engine coolant temperature at the engine coolant outlet of the engine and send the obtained data to the TRS Controller. In some embodiments, the engine coolant can be water.

In another embodiment, the condenser/radiator performance parameter sensor is a condenser/radiator air discharge temperature sensor configured to measure an air discharge temperature at the condenser or the radiator and send the obtained data to the TRS Controller.

In yet another embodiment, the condenser/radiator performance parameter sensor is a condenser/radiator air outlet temperature sensor that is configured to measure an air outlet temperature at an outlet of the condenser or the radiator. The process 400 then proceeds to 415.

At 415, the TRS Controller determines whether the condenser/radiator performance parameter is greater than or equal to a temperature threshold $X_1$. For example, if the condenser/radiator performance parameter is the engine coolant outlet temperature of the engine, the temperature threshold $X_1$ can be set to about 200° F. That is, in some embodiments, it has been found that when the engine coolant outlet temperature is below about 200° F., the static air pressure at the condenser fan outlets 225 does not negatively affect the performance of the TRU. Accordingly, when the performance of the TRU is not being negatively affected, there is no need to increase the speed of the condenser fan(s). If the condenser/radiator performance parameter is less than the temperature threshold $X_1$, the process 400 proceeds to 420. If the condenser/radiator performance parameter is greater than or equal to the threshold $X_1$, the process 400 proceeds to 430.

At 420, the TRS Controller sets a fan speed of condenser fans of the TRU (e.g., the condenser fans 144 shown in FIG. 1A) to a low speed. In some embodiments, the low speed can be ~1620 rpm. By operating the condenser fans at the low speed, the refrigerated transport unit can operate under lower noise levels. For example, in some embodiments, the sound level of the condenser fans can be reduced by ~9 dBA and the net refrigerated transport unit sound level can be reduced by ~2.5 dBA when the condenser fans are operating at the low speed. The process 400 then waits a time period $T_2$ at 425 before proceeding to 410. In some embodiments, the time period $T_2$ can be set to a value, for example, between ~0 minutes and ~15 minutes.

At 430, the TRS Controller sets one or more of the condenser fans to a high speed. In some embodiments, the high speed can be ~2650 rpm. Further, in some embodiments, when one or more of the condenser fans are electronically controlled condenser fans, the electronically controlled condenser fan(s) can include a boost mode that allows the condenser fan(s) to increase from ~2650 rpm to ~3250 rpm. The process 400 then proceeds to 435.

By increasing the fan speed of the condenser fans, the static air pressure at an outlet of the condenser fans can be decreased, thereby improving the performance of the TRU. In some embodiments, a fan power reduction can be achieved for each condenser fan operating at the high speed, thus resulting in fuel savings for powering the TRS. Also, by increasing the fan speed of the condenser fans, the compressor discharge pressure can be decreased.

At 435, the TRS controller waits a time period $T_1$ and then the process 400 proceeds to 440. In some embodiments, the time period $T_1$ can be set to a value, for example, between ~0 minutes and ~15 minutes. At 440, the TRS Controller determines/measures the condenser/radiator performance parameter again and sends the obtained data to the TRS Controller. The process 400 then proceeds to 445.

At 445, the TRS Controller determines whether the condenser/radiator performance parameter is less than a second temperature threshold $X_2$. For example, if the condenser/radiator performance parameter is the engine coolant outlet temperature of the engine, the second temperature threshold $X_2$ can be set to a value between about 185° F. to about 190° F. That is, in some embodiments, it has been found that when the engine coolant outlet temperature is below a temperature between about 185° F. to about 190° F., it is safe to operate the condenser fans at the low speed without negatively affecting the performance of the TRU. If the condenser/radiator performance parameter is less than the temperature threshold $X_2$, the process 400 proceeds to 420. If the condenser/radiator performance parameter is greater than or equal to the threshold $X_2$, the process 400 proceeds to 425.

Figure 5:
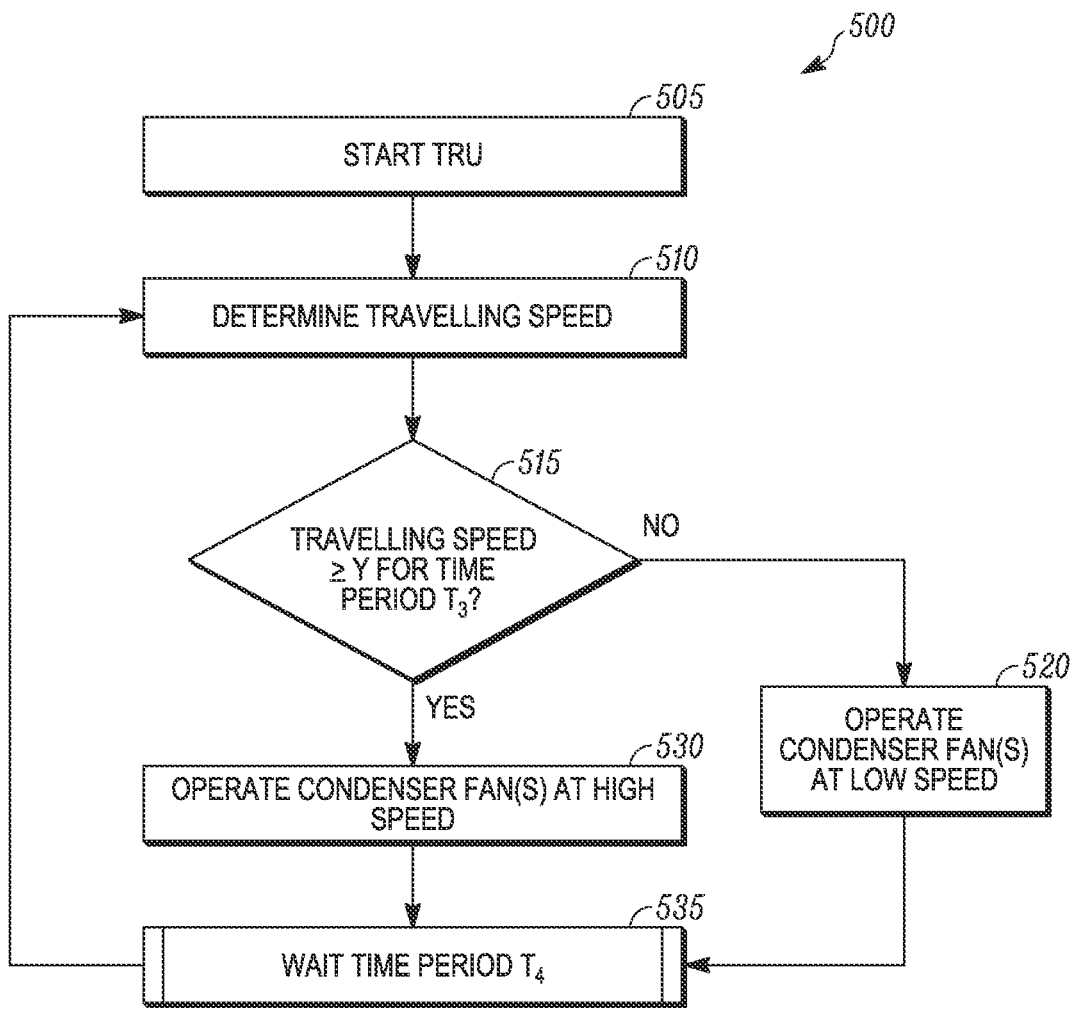
FIG. 5 illustrates a flowchart of a process for controlling condenser/radiator airflow of the TRS, according to another embodiment.

FIG. 5 illustrates another embodiment of a process 500 for controlling condenser/radiator airflow of a TRS (e.g., the TRS 120 shown in FIG. 1A) based on a travelling speed of a refrigerated transport unit. At 505, a TRU (e.g., the TRU 140 shown in FIG. 1A) is started. The process 500 then proceeds to 510.

At 510, a TRS Controller of the TRU (e.g., the TRS Controller 305 shown in FIG. 3) determines/measures a travelling speed of a refrigerated transport unit (e.g., the refrigerated transport unit 100 shown in FIG. 1A) in which the TRS is provided and determines an ambient temperature of the area surrounding the refrigerated transport unit. In some embodiments, the TRS Controller can include a GPS tracking unit that can be used by the TRS Controller to determine the travelling speed of the refrigerated transport unit. Also, in some embodiments, the TRS includes an ambient temperature sensor located on, for example, an outside surface of the refrigerated transport unit to measure the ambient temperature of the area surrounding the refrigerated transport unit. The process 500 then proceeds to 515.

At 515, the TRS Controller determines whether the travelling speed of the refrigerated transport unit is greater than or equal to a travelling speed threshold Y for a time period $T_3$. If the travelling speed of the refrigerated transport unit is less than the travelling speed threshold Y for the time period $T_3$, the process 500 then proceeds to 520. If the travelling speed of the refrigerated transport unit is greater than or equal to the travelling speed threshold Y for the time period $T_3$, the process 500 proceeds to 530.

In some embodiments, the time period $T_3$ can be based on the obtained ambient temperature. For example, in one embodiment, if the obtained ambient temperature is between ~70° F. to ~80° F., the time period $T_3$ can be set to a value between ~20 to ~30 minutes. In this same embodiment, if the obtained ambient temperature is between ~80° F. to ~100° F., the time period $T_3$ can be set to a value between ~15 to ~20 minutes. Also in this embodiment, if the obtained ambient temperature is between ~100° F. to ~120° F., the time period $T_1$ can be set to a value between ~5 to ~10 minutes. It is known that a higher ambient temperature can cause a higher compressor discharge pressure.

At 520, the TRS Controller sets a fan speed of condenser fans of the TRU (e.g., the condenser fans 144 shown in FIG. 1A) to a low speed. In some embodiments, the low speed can be ~1620 rpm. By operating the condenser fans at the low speed, the refrigerated transport unit can operate under lower noise levels. For example, in some embodiments, the sound level of the condenser fans can be reduced by ~9 dBA and the net refrigerated transport unit sound level can be reduced by ~2.5 dBA when the condenser fans are operating at the low speed. The process 500 then waits a time period $T_4$ at 535 before proceeding to 510. In some embodiments, the time period $T_4$ can be set to a value, for example, between ~0 minutes and ~15 minutes.

At 530, the TRS Controller sets one or more of the condenser fans to a high speed. In some embodiments, the high speed can be ~2650 rpm. Further, in some embodiments, when one or more of the condenser fans are electronically controlled condenser fans, the electronically controlled condenser fan(s) can include a boost mode that allows the condenser fan(s) to increase from ~2650 rpm to ~3250 rpm. The process 500 then proceeds to 535.

By increasing the fan speed of the condenser fans, the static air pressure at an outlet of the condenser fans can be decreased, thereby improving the performance of the TRU. In some embodiments, a fan power reduction can be achieved for each condenser fan operating at the high speed, thus resulting in fuel savings for powering the TRS. Also, by increasing the fan speed of the condenser fans, the compressor discharge pressure can be decreased.

Figure 6:
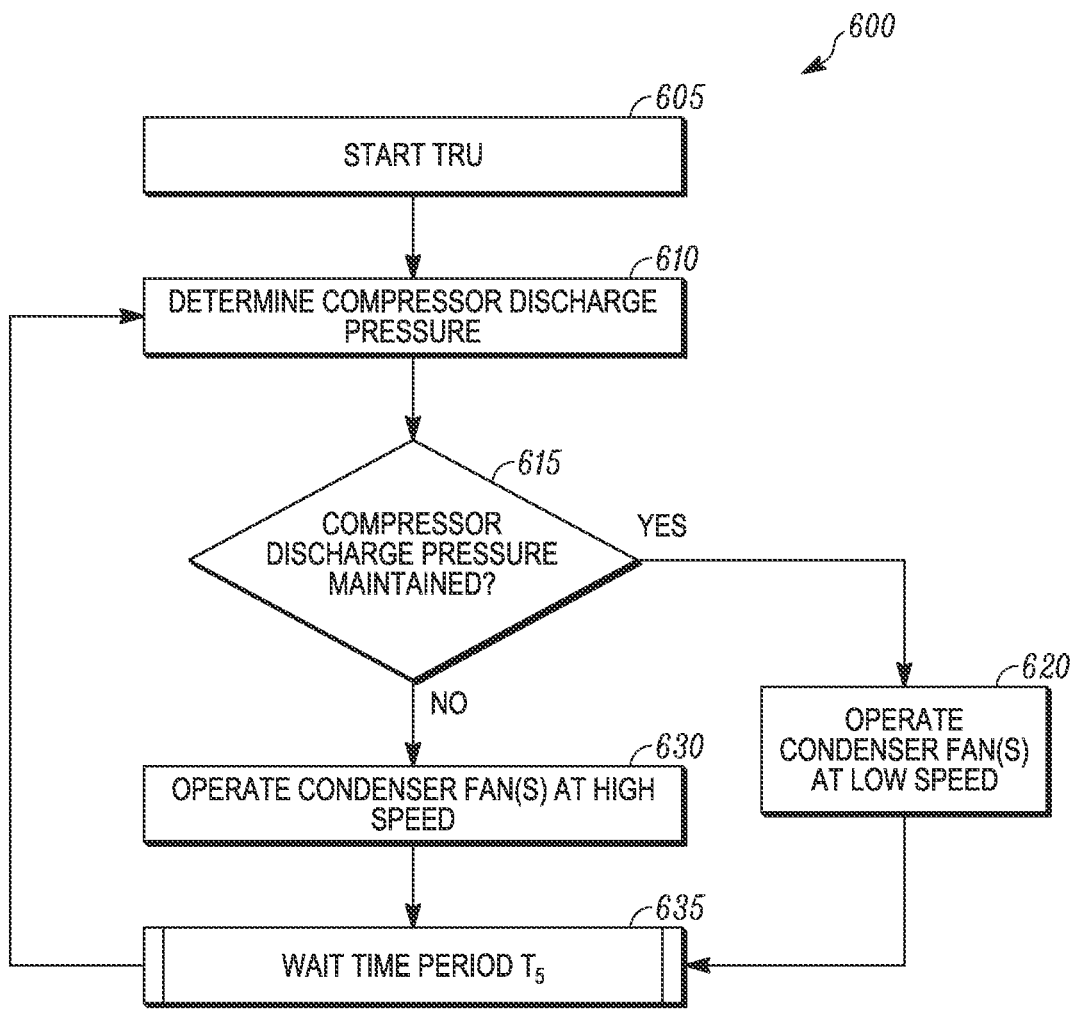
FIG. 6 illustrates a flowchart of a process for controlling condenser/radiator airflow of the TRS, according to yet another embodiment.

FIG. 6 illustrates yet another embodiment of a process 600 for controlling condenser/radiator airflow of a TRS (e.g., the TRS 120 shown in FIG. 1A) based on a compressor discharge pressure. By controlling the fan speed of the condenser fans based on the compressor discharge pressure, situations where there may be no need to increase the speed of the condenser fans, even at highway speeds, (e.g., certain ambient and box temperature conditions—part load conditions; the refrigerated transport unit has reached a temperature set point for the internal space of the transport unit and does not require a large refrigeration capacity for cooling the internal space; the refrigerated transport unit is travelling in rain and thus the TRU is not being negatively affected by the surrounding conditions; refrigerated transport unit traveling under cross winds that are not negatively affecting TRU performance; etc.) can be accounted for.

Also, it has been found that the higher the compressor discharge pressure, the greater the horsepower required by the compressor. This can cause the engine to require more fuel to meet the higher compressor horsepower. Thus, fuel performance can be optimized by reducing the compressor discharge pressure.

The process 600 begins at 605, where a TRU (e.g., the TRU 140 shown in FIG. 1A) is started. The process 600 then proceeds to 610.

At 610, a TRS Controller of the TRU (e.g., the TRS Controller 305 shown in FIG. 3) determines a compressor discharge pressure of a compressor of the TRU (e.g., the compressor 318 shown in FIG. 3). In some embodiments, a compressor discharge pressure sensor can be used to directly determine/measure the compressor discharge pressure of the compressor and send the obtained data to the TRS Controller. The process 600 then proceeds to 615.

At 615, the TRS Controller determines whether an optimum compressor discharge pressure is maintained. In some embodiments, the TRS Controller can determine that an optimum compressor discharge pressure is not being maintained if the compressor discharge pressure is greater than the optimum compressor discharge pressure. If the optimum compressor discharge pressure is being maintained, the process 600 proceeds to 620. If the optimum compressor discharge pressure is not being maintained, the process 600 proceeds to 630.

At 620, the TRS Controller sets a fan speed of condenser fans of the TRU (e.g., the condenser fans 144 shown in FIG. 1A) to a low speed. In some embodiments, the low speed can be ~1620 rpm. By operating the condenser fans at the low speed, the refrigerated transport unit can operate under lower noise levels. For example, in some embodiments, the sound level of the condenser fans can be reduced by ~9 dBA and the net refrigerated transport unit sound level can be reduced by ~2.5 dBA when the condenser fans are operating at the low speed. The process 600 then waits a time period $T_5$ at 635 before proceeding to 610. In some embodiments, the time period $T_5$ can be set to a value, for example, between ~0 minutes and ~15 minutes.

At 630, the TRS Controller sets one or more of the condenser fans to a high speed. In some embodiments, the high speed can be ~2650 rpm. Further, in some embodiments, when one or more of the condenser fans are electronically controlled condenser fans, the electronically controlled condenser fan(s) can include a boost mode that allows the condenser fan(s) to increase from ~2650 rpm to ~3250 rpm. The process 600 then proceeds to 635.

By increasing the fan speed of the condenser fans, the static air pressure at an outlet of the condenser fans can be decreased, thereby improving the performance of the TRU. In some embodiments, a fan power reduction can be achieved for each condenser fan operating at the high speed, thus resulting in fuel savings for powering the TRS. Also, by increasing the fan speed of the condenser fans, the compressor discharge pressure can be increased.

Aspects:

It is noted that any of aspects 1-5, 6-12, 13-14 and 15-19 can be combined.

Aspect 1. A method of controlling condenser/radiator airflow in a transport refrigeration system, comprising:
determining an airflow performance value indicating a static air pressure at an outlet of a condenser fan of the transport refrigeration system;
comparing the airflow performance value to an airflow performance threshold; and
increasing a fan speed of the condenser fan when the airflow performance value extends past the airflow performance threshold.

Aspect 2. The method of aspect 1, wherein the air flow performance value is a condenser/radiator performance parameter,
wherein the airflow performance threshold is a condenser/radiator performance parameter threshold value, and
increasing the fan speed of the condenser fan when the condenser/radiator performance parameter extends above the airflow performance threshold value.

Aspect 3. The method of aspect 2, wherein the condenser/radiator performance parameter is at least one of: an engine coolant temperature, a condenser air discharge temperature, a radiator air discharge temperature, a condenser air outlet temperature or a radiator air outlet temperature, and
wherein the airflow performance threshold is a condenser/radiator performance parameter threshold value and includes at least one of: a maximum desired engine coolant temperature, a maximum desired condenser air discharge temperature, a maximum desired radiator air discharge temperature, a maximum desired condenser air outlet temperature or a maximum desired radiator air outlet temperature.

Aspect 4. The method of aspect 1, wherein the air flow performance value is a travelling speed of the transport refrigeration system,
wherein the airflow performance threshold is a transport refrigeration system travelling speed threshold value, and
increasing the fan speed of the condenser fan when the travelling speed of the transport refrigeration system extends above the transport refrigeration travelling speed threshold value for a set time period.

Aspect 5. The method of aspect 1, wherein the air flow performance value is a compressor discharge pressure of a compressor of the transport refrigeration system,
wherein the airflow performance threshold is a compressor discharge pressure range, and
increasing the fan speed of the condenser fan when the compressor discharge pressure extends outside of the compressor discharge pressure range.

Aspect 6. A method of controlling condenser/radiator airflow in a transport refrigeration system for a refrigerated transport, comprising:
measuring a condenser/radiator performance parameter of at least one of a condenser or a radiator of the transport refrigeration system;
comparing the condenser/radiator performance parameter to a condenser/radiator performance threshold; and
increasing a fan speed of a condenser fan when the measured condenser/radiator performance parameter exceeds the condenser/radiator performance threshold.

Aspect 7. The method of aspect 6, wherein the condenser/radiator performance parameter is at least one of: an engine coolant temperature, a condenser air discharge temperature, a radiator air discharge temperature, a condenser air outlet temperature or a radiator air outlet temperature,
wherein the airflow performance threshold is a condenser/radiator performance parameter threshold value and includes at least one of: a maximum desired engine coolant temperature, a maximum desired condenser air discharge temperature, a maximum desired radiator air discharge temperature, a maximum desired condenser air outlet temperature or a maximum desired radiator air outlet temperature.

Aspect 8. The method of any of aspects 6-7, further comprising:
waiting a first time period after increasing the fan speed of the condenser fan;
measuring the condenser/radiator performance parameter of at least one of the condenser or the radiator of the transport refrigeration system after waiting the first time period; and
decreasing a fan speed of the condenser fan when the condenser/radiator performance parameter measured after the first time period is less than a second compressor/radiator performance threshold.

Aspect 9. A method of controlling condenser/radiator airflow in a transport refrigeration system for a refrigerated transport, comprising:
measuring a travelling speed of the transport refrigeration system;
comparing the travelling speed of the transport refrigeration system to a transport refrigeration system travelling speed threshold value; and
increasing a fan speed of a condenser fan of the transport refrigeration system when the measured travelling speed of the transport refrigeration system exceeds the transport refrigeration system travelling speed threshold value for a set time period.

Aspect 10. The method of aspect 9, wherein the set time period is determined based on an ambient temperature of an area surrounding the refrigerated transport unit.

Aspect 11. The method of any of aspects 9-10, wherein the transport refrigeration system traveling speed threshold value is 65 mph.

Aspect 12. The method of any of aspects 9-11, further comprising:
decreasing the fan speed of the condenser fan when the measured travelling speed is less than the transport refrigeration system travelling speed threshold value.

Aspect 13. A method of controlling condenser/radiator airflow in a transport refrigeration system for a refrigerated transport, comprising:
measuring a compressor discharge pressure of a compressor of the transport refrigeration system;
comparing the compressor discharge pressure to a compressor discharge pressure range; and
increasing a fan speed of the condenser fan when the compressor discharge pressure exceeds outside the compressor discharge pressure range.

Aspect 14. The method of aspect 13, further comprising:
decreasing the fan speed of the condenser fan when the compressor discharge pressure is within the compressor discharge pressure range.

Aspect 15. A transport refrigeration system, comprising:
a refrigeration circuit, the refrigeration circuit including:
a compressor, an evaporator, a condenser, a throttling valve, and a temperature sensor;
a condenser fan configured to discharge air out of the transport refrigeration system; and
a controller, the controller configured to:
control the refrigeration circuit and a fan speed of the condenser fan,
determine an airflow performance value indicating a static air pressure at an outlet of the condenser fan,
compare the airflow performance value to an airflow performance threshold, and
increase fan speed of the condenser fan when the airflow performance value extends past the airflow performance threshold.

Aspect 16. The transport refrigeration system of aspect 15, wherein the air flow performance value is a condenser/radiator performance parameter,
wherein the airflow performance threshold is a condenser/radiator performance parameter threshold value, and
wherein the controller is configured to increase the fan speed of the condenser fan when the condenser/radiator performance parameter extends above the airflow performance threshold value.

Aspect 17. The transport refrigeration system of aspect 16, wherein the condenser/radiator performance parameter is at least one of: an engine coolant temperature, a condenser air discharge temperature, a radiator air discharge temperature, a condenser air outlet temperature or a radiator air outlet temperature, and
wherein the airflow performance threshold is a condenser/radiator performance parameter threshold value and includes at least one of: a maximum desired engine coolant temperature, a maximum desired condenser air discharge temperature, a maximum desired radiator air discharge temperature, a maximum desired condenser air outlet temperature or a maximum desired radiator air outlet temperature.

Aspect 18. The transport refrigeration system of aspect 16, wherein the air flow performance value is a travelling speed of the transport refrigeration system,
wherein the airflow performance threshold is a transport refrigeration system travelling speed threshold value, and
wherein the controller is configured to increase the fan speed of the condenser fan when the travelling speed of the transport refrigeration system extends above the transport refrigeration travelling speed threshold value for a set time period.

Aspect 19. The transport refrigeration system of aspect 15, wherein the air flow performance value is a compressor discharge pressure of a compressor of the transport refrigeration system,
wherein the airflow performance threshold is a compressor discharge pressure range, and
wherein the controller is configured to increase the fan speed of the condenser fan when the compressor discharge pressure extends outside of the compressor discharge pressure range.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:
1. A method of controlling condenser/radiator airflow in a transport refrigeration system, wherein the transport refrigeration system includes a transport refrigeration unit that includes a condenser fan that discharges air out of the transport refrigeration unit from an outlet of the condenser fan into the environment while in transport, the method comprising:
determining a static air pressure at the outlet of the condenser fan of the transport refrigeration system based on an airflow performance value;
comparing the airflow performance value to an airflow performance threshold to determine whether the static air pressure at the outlet of the condenser fan negatively impacts performance of the transport refrigeration unit; and increasing a fan speed of the condenser fan when the airflow performance value extends past the airflow performance threshold to decrease the static air pressure at the outlet of the condenser fan.

2. The method of claim 1, wherein the air flow performance value is a condenser/radiator performance parameter,
wherein the airflow performance threshold is a condenser/radiator performance parameter threshold value, and
increasing the fan speed of the condenser fan when the condenser/radiator performance parameter extends above the airflow performance threshold value.

3. The method of claim 2, wherein the condenser/radiator performance parameter is at least one of: an engine coolant temperature, a condenser air discharge temperature, a radiator air discharge temperature, a condenser air outlet temperature or a radiator air outlet temperature, and
wherein the airflow performance threshold is a condenser/radiator performance parameter threshold value and includes at least one of: a maximum desired engine coolant temperature, a maximum desired condenser air discharge temperature, a maximum desired radiator air discharge temperature, a maximum desired condenser air outlet temperature or a maximum desired radiator air outlet temperature.

4. The method of claim 1, wherein the air flow performance value is a travelling speed of the transport refrigeration system,
wherein the airflow performance threshold is a transport refrigeration system travelling speed threshold value, and
increasing the fan speed of the condenser fan when the travelling speed of the transport refrigeration system extends above the transport refrigeration travelling speed threshold value for a set time period.

5. The method of claim 1, wherein the air flow performance value is a compressor discharge pressure of a compressor of the transport refrigeration system,
wherein the airflow performance threshold is a compressor discharge pressure range, and
increasing the fan speed of the condenser fan when the compressor discharge pressure extends outside of the compressor discharge pressure range.

6. A method of controlling condenser/radiator airflow in a transport refrigeration system for a refrigerated transport unit, wherein the transport refrigeration system includes a transport refrigeration unit that includes a condenser fan that discharges air out of the transport refrigeration unit from an outlet of the condenser fan into the environment while in transport, the method comprising:
measuring a condenser/radiator performance parameter of at least one of a condenser or a radiator of the transport refrigeration system to determine a static air pressure at the outlet of the condenser fan caused by ambient air passing over the outlet while the refrigerated transport unit is in transport;
comparing the condenser/radiator performance parameter to a condenser/radiator performance threshold to determine whether the static air pressure at the outlet of the condenser fan negatively impacts performance of the transport refrigeration unit; and
increasing a fan speed of a condenser fan when the measured condenser/radiator performance parameter exceeds the condenser/radiator performance threshold to decrease the static air pressure at the outlet of the condenser fan caused by the ambient air passing over the outlet while the refrigerated transport unit is in transport.

7. The method of claim 6, wherein the condenser/radiator performance parameter is at least one of: an engine coolant temperature, a condenser air discharge temperature, a radiator air discharge temperature, a condenser air outlet temperature or a radiator air outlet temperature,
wherein the airflow performance threshold is a condenser/radiator performance parameter threshold value and includes at least one of: a maximum desired engine coolant temperature, a maximum desired condenser air discharge temperature, a maximum desired radiator air discharge temperature, a maximum desired condenser air outlet temperature or a maximum desired radiator air outlet temperature.

8. The method of any of claim 6, further comprising:
waiting a first time period after increasing the fan speed of the condenser fan;
measuring the condenser/radiator performance parameter of at least one of the condenser or the radiator of the transport refrigeration system after waiting the first time period; and
decreasing a fan speed of the condenser fan when the condenser/radiator performance parameter measured after the first time period is less than a second compressor/radiator performance threshold.

9. A method of controlling condenser/radiator airflow in a transport refrigeration system for a refrigerated transport unit, wherein the transport refrigeration system includes a transport refrigeration unit that includes a condenser fan that discharges air out of the transport refrigeration unit from an outlet of the condenser fan into the environment while in transport, the method comprising:
measuring a travelling speed of the transport refrigeration system to determine a static air pressure at the outlet of the condenser fan caused by ambient air passing over the outlet while the refrigerated transport unit is in transport;
comparing the travelling speed of the transport refrigeration system to a transport refrigeration system travelling speed threshold value to determine whether the static air pressure at the outlet of the condenser fan negatively impacts performance of the transport refrigeration unit; and
increasing a fan speed of a condenser fan of the transport refrigeration system when the measured travelling speed of the transport refrigeration system exceeds the transport refrigeration system travelling speed threshold value for a set time period to decrease the static air pressure at the outlet of the condenser fan caused by the ambient air passing over the outlet while the refrigerated transport unit is in transport.

10. The method of claim 9, wherein the set time period is determined based on an ambient temperature of an area surrounding the refrigerated transport unit.

11. The method of any of claim 9, wherein the transport refrigeration system traveling speed threshold value is 65 mph.

12. The method of any of claim 9, further comprising:
decreasing the fan speed of the condenser fan when the measured travelling speed is less than the transport refrigeration system travelling speed threshold value.

13. A method of controlling condenser/radiator airflow in a transport refrigeration system for a refrigerated transport unit, wherein the transport refrigeration system includes a transport refrigeration unit that includes a condenser fan that discharges air out of the transport refrigeration unit from an outlet of the condenser fan into the environment while in transport, the method comprising:

measuring a compressor discharge pressure of a compressor of the transport refrigeration system to determine a static air pressure at the outlet of the condenser fan caused by ambient air passing over the outlet while the refrigerated transport unit is in transport;

comparing the compressor discharge pressure to a compressor discharge pressure range to determine whether the static air pressure at the outlet of the condenser fan negatively impacts performance of the transport refrigeration unit; and increasing a fan speed of the condenser fan when the compressor discharge pressure exceeds outside the compressor discharge pressure range to decrease the static air pressure at the outlet of the condenser fan caused by the ambient air passing over the outlet while the refrigerated transport unit is in transport.

14. The method of claim 13, further comprising:

decreasing the fan speed of the condenser fan when the compressor discharge pressure is within the compressor discharge pressure range.

15. A transport refrigeration system, comprising:
a refrigeration circuit, the refrigeration circuit including:
   a compressor,
   an evaporator,
   a condenser, and
   a throttling valve;
a condenser fan configured to discharge air out of the transport refrigeration system from an outlet of the condenser fan into the environment while in transport; and
a controller, the controller configured to:
   control the refrigeration circuit and a fan speed of the condenser fan,
   determine a static air pressure at the outlet of the condenser fan based on an airflow performance value,
   compare the airflow performance value to an airflow performance threshold to determine whether the static air pressure at the outlet of the condenser fan negatively impacts performance of the transport refrigeration system, and
   increase fan speed of the condenser fan when the airflow performance value extends past the airflow performance threshold to decrease the static air pressure at the outlet of the condenser fan.

16. The transport refrigeration system of claim 15, wherein the air flow performance value is a condenser/radiator performance parameter,
   wherein the airflow performance threshold is a condenser/radiator performance parameter threshold value, and
   wherein the controller is configured to increase the fan speed of the condenser fan when the condenser/radiator performance parameter extends above the airflow performance threshold value.

17. The transport refrigeration system of claim 16, wherein the condenser/radiator performance parameter is at least one of: an engine coolant temperature, a condenser air discharge temperature, a radiator air discharge temperature, a condenser air outlet temperature or a radiator air outlet temperature, and
   wherein the airflow performance threshold is a condenser/radiator performance parameter threshold value and includes at least one of: a maximum desired engine coolant temperature, a maximum desired condenser air discharge temperature, a maximum desired radiator air discharge temperature, a maximum desired condenser air outlet temperature or a maximum desired radiator air outlet temperature.

18. The transport refrigeration system of claim 15, wherein the air flow performance value is a travelling speed of the transport refrigeration system,
   wherein the airflow performance threshold is a transport refrigeration system travelling speed threshold value, and
   wherein the controller is configured to increase the fan speed of the condenser fan when the travelling speed of the transport refrigeration system extends above the transport refrigeration travelling speed threshold value for a set time period.

19. The transport refrigeration system of claim 15, wherein the air flow performance value is a compressor discharge pressure of the compressor of the transport refrigeration system,
   wherein the airflow performance threshold is a compressor discharge pressure range, and
   wherein the controller is configured to increase the fan speed of the condenser fan when the compressor discharge pressure extends outside of the compressor discharge pressure range.

* * * * *